April 21, 1931.  A. W. CAPS  1,802,193
PHOTOGRAPHIC APPARATUS
Filed Dec. 28, 1927  4 Sheets-Sheet 2
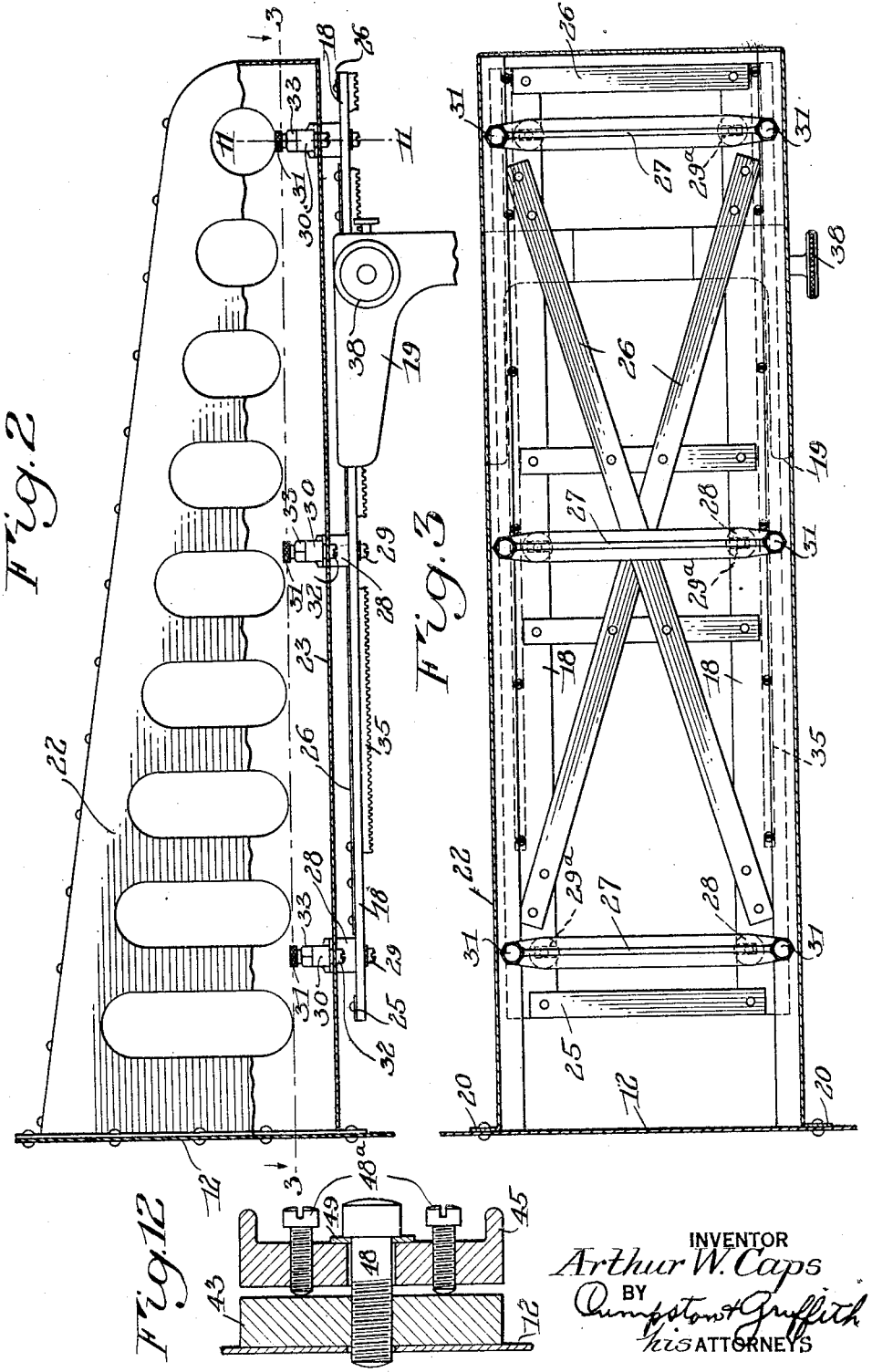

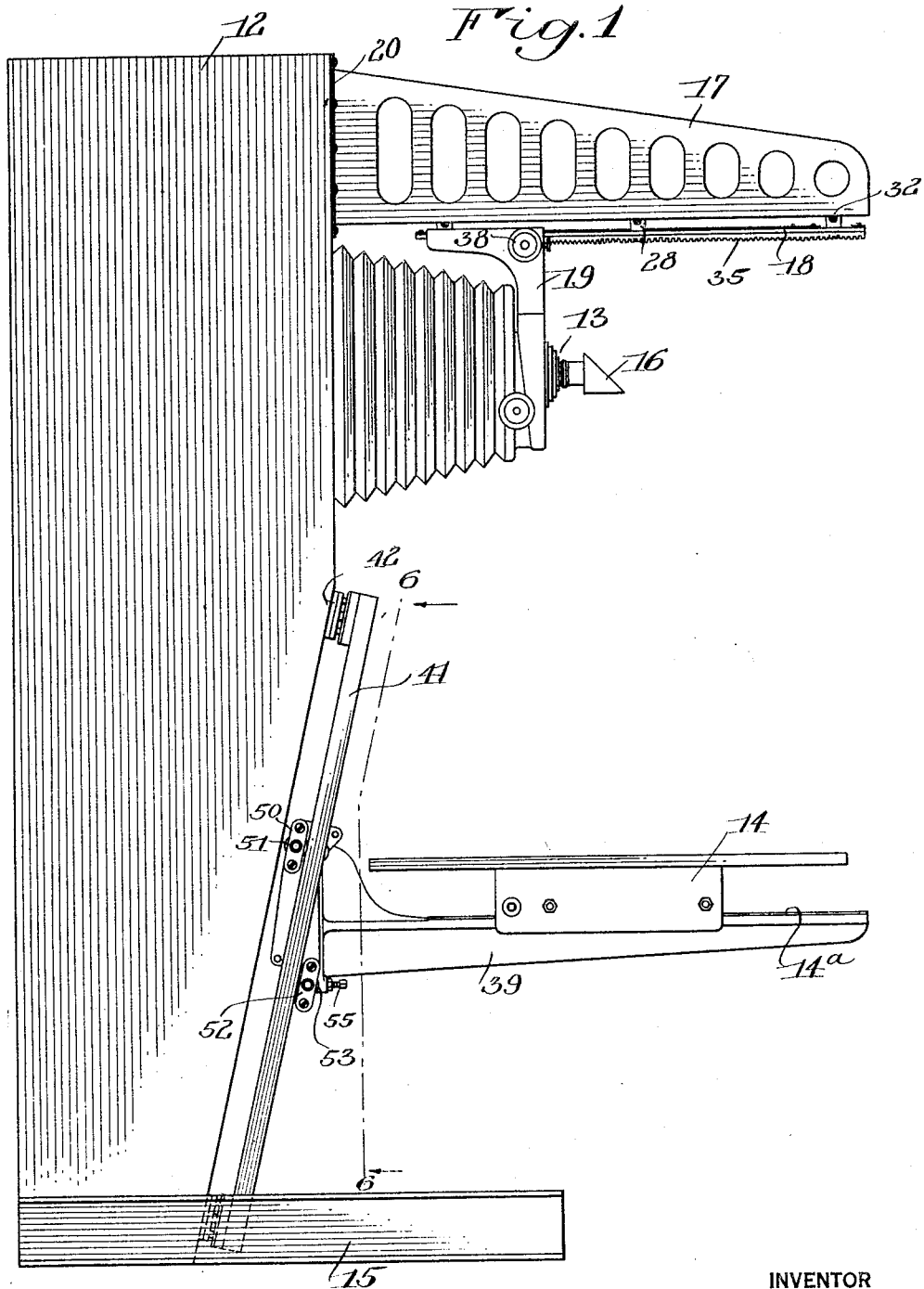

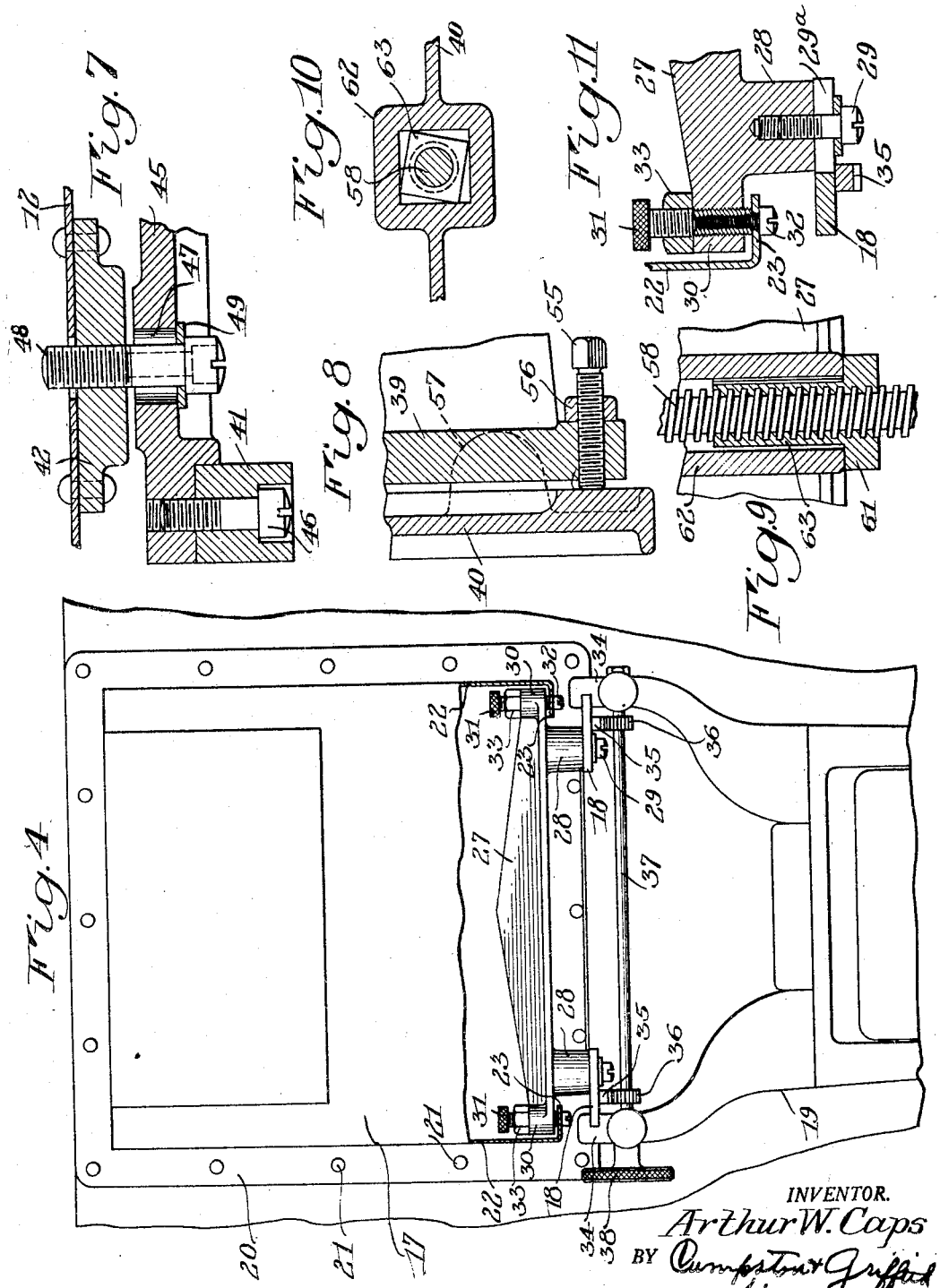

April 21, 1931. A. W. CAPS 1,802,193
PHOTOGRAPHIC APPARATUS
Filed Dec. 28, 1927 4 Sheets-Sheet 4
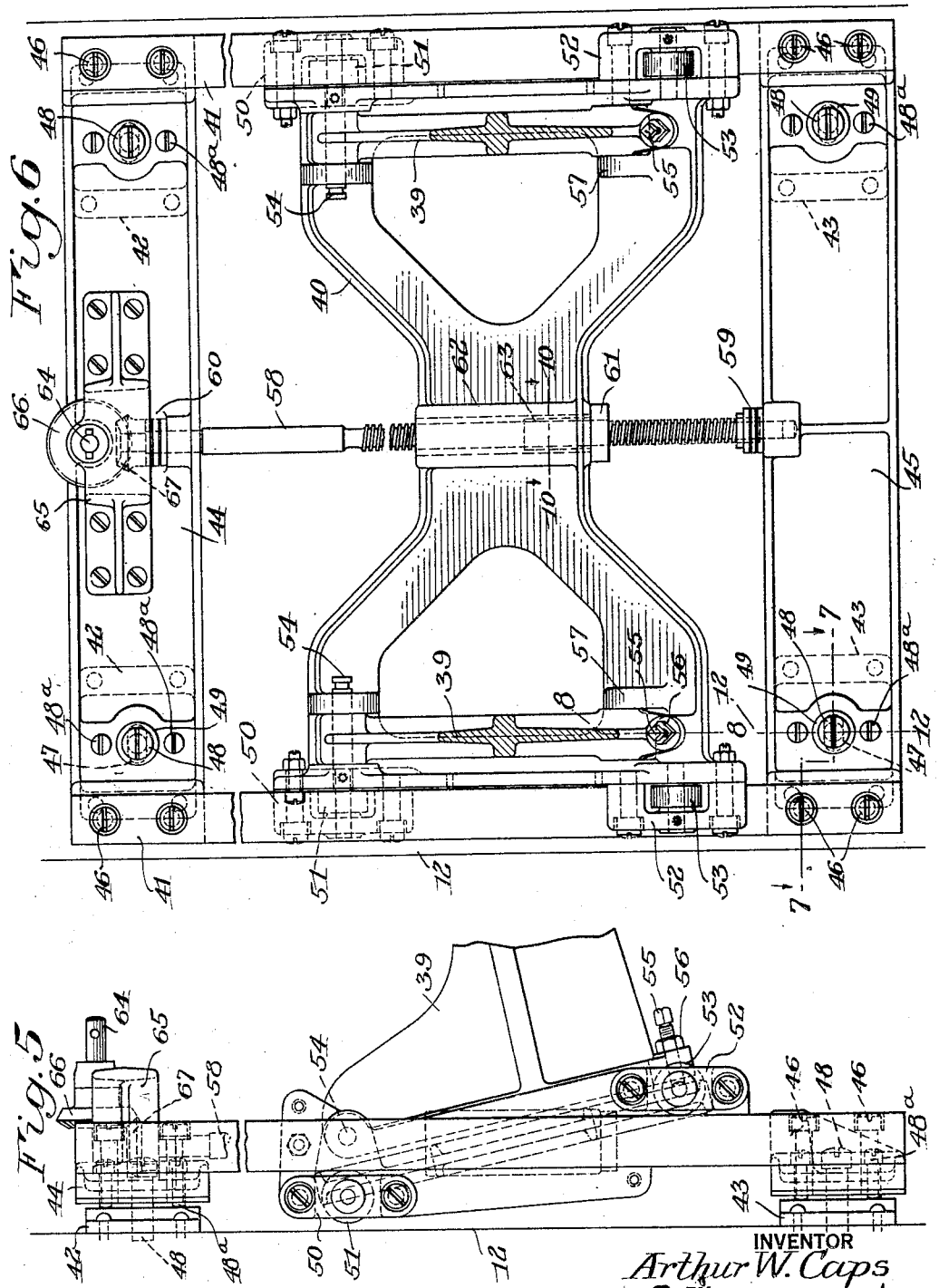
INVENTOR
Arthur W. Caps
BY
Crumpston Griffith
his ATTORNEYS Patented Apr. 21, 1931

1,802,193

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

PHOTOGRAPHIC APPARATUS

Application filed December 28, 1927. Serial No. 243,082.

The present invention relates to photographic apparatus and more especially to camera machines for making enlarged or reduced photographic copies of documents and like objects. These machines, known as "copying machines" embody, as major elements, photographic exposing mechanism and copyholding mechanism therefor. This invention has for an object the provision of a simple and effective construction and arrangement of such parts and their sub-elements whereby they may be accurately correlated in their functions and movements. Another object is the provision of means of this character of a nature permitting them to be utilized as a lasting assembly or factory adjustment whereby the mounting elements for the lens system and the copy holding means may be accurately and securely placed in correct operating positions relatively to each other.

To these and other ends the invention resides in certain improvements and combinations of parts, all as will be hereinafter more fully described, the novel features being pointed out in the claims at the end of the specification.

In the drawings:

Fig. 1 is a side elevation of the photographic apparatus embodying the present invention;

Fig. 2 is an enlarged detail view of the supporting means upon which the lens and prism system are slidably mounted;

Fig. 3 is a horizontal view, partly in section, taken on line 3—3 of Fig. 2;

Fig. 4 is an enlarged detail view of the front of the support for the camera lens;

Fig. 5 is an enlarged detail view in side elevation of the guiding track for the copyholder support;

Fig. 6 is a detail front elevation taken partly in section on line 6—6 of Fig. 1, looking in the direction of the arrows;

Fig. 7 is a sectional detail taken on line 7—7 of Fig. 6, illustrating the means for securing the track supporting frame in different adjusted positions;

Fig. 8 is a sectional detail view taken substantially on line 8—8 of Fig. 6, and illustrating the means for adjusting the laterally extending arms of the copyholder support;

Fig. 9 is a fragmentary sectional detail view illustrating the manner of associating the copyholder support with its adjusting screw;

Fig. 10 is a detail view in horizontal section taken on line 10—10 of Fig. 6,

Fig. 11 is a fragmentary detail view taken in section on line 11—11 of Fig. 3, illustrating the manner of adjusting the supporting tracks for the lens mounting element, and Fig. 12 is a detail view taken on line 12—12 of Fig. 6, illustrating the manner of supporting the corners of the track frame for adjustment toward and from the casing.

Similar reference numerals throughout the several views indicate the same parts.

This application is in part a continuation of application Serial No. 38,844, filed June 22, 1925.

Certain features disclosed but not claimed in the present application are claimed in my copending application for photographic apparatus, Serial No. 237,401, filed December 3, 1927, now Patent No. 1,793,837, granted February 24, 1931.

The present embodiment of the invention provides an effective construction of a photographic apparatus which is particularly advantageous for heavy commercial cameras of relatively large size. In the construction of photographic apparatus of this nature it has been found desirable to form the main frame work of relatively light fabricated shapes which are assembled by means of riveting or welding and by this method a very strong and rigid construction is provided which can be manufactured at a low cost due to the rapidity of the assembling operations. However, in constructions of this nature it is not always practicable from an economical standpoint to align the main parts of the frame work in exactly true relations to each other, and accordingly, other means must be provided for obtaining exact adjustments of the parts.

The present invention is directed toward the idea of utilizing the above outlined method of assembling of the main part of the frame work of the device and incorporating therewith suitable auxiliary means for supporting the moving parts, which are adjustable for the purpose of enabling all of the parts of the device to be correctly positioned and guided relatively to each other.

In a general way the invention, as disclosed, embodies a supporting frame work for a photographic apparatus having means thereon for adjustably mounting the lens system and the copyholder and having combined therewith a simple and efficient means by which the lens system and copyholder may be accurately alined and positioned relatively to each other.

Referring more particularly to the drawings, there is shown at 12 in Fig. 1 a casing for a photographic apparatus on which is supported an adjustable lens system 13 and a copyholder 14.

The casing 12 is supported on a suitable base frame 15 of any convenient construction. The lens system preferably includes a lens, not shown, and a prism 16 of the total reflecting type which serves to bend or reflect light rays from an object on the copyholder 14 through the lens and onto the sensitized material within the casing 12.

Means are provided upon the casing 12 for guiding the lens system along a generally horizontal path. For this purpose a frame 17, formed of relatively light sheet metal, is secured to the front of the casing 12 near its upper end and carries on its under side a pair of tracks or guides 18, upon which the mounting element 19 for the lens system is adapted to be adjusted toward and away from the casing 12.

The frame 17 has an outwardly flaring portion 20 which is suitably secured to the front of casing 12 as by means of rivets 21.

In order to insure the correct positioning of tracks 18 to bring the lens system into proper relation to the copyholder, means are preferably provided for adjusting the position of the track with relation to the frame 17. For this purpose the side members 22, 22 of the frame 17 have inwardly bent flanges 23 at their lower edges and extending the length thereof, upon which the guides or tracks 18 are adjustably secured. The tracks 18 are preferably a part of a skeleton frame 24 of which the tracks form side members, being connected with transverse members 25 and diagonal braces 26. The frame 24 is supported from the flanges 23 by means of a plurality of bridging members 27 which have downwardly depending lugs 28 suitably secured to the tracks 18 by means of bolts 29 as shown best in Fig. 4.

For the purpose of permitting lateral adjustment of the tracks 18, the apertures through which the bolts 29 pass are preferably in the form of slots or notches 29ª, see particularly Figs. 3 and 11. By this construction, if the optical axis is not properly centered over the copyholder the lens mounting element may be moved laterally one way or the other by the bolt and slot arrangement until the lens axis is in the proper position.

The bridging members 27 are preferably mounted upon the frame 17 for vertical adjustment thereon. For this purpose the members 27 have outwardly extending lugs 30 into which are threaded adjusting screws 31 which rest at their lower ends on the upper surface of flanges 23. By turning the screws 31 the ends of the bridging members 27 may be moved closer to or farther from the surface of the flanges. In order to hold the end of each screw 31 against the upper surface of the flanges 23, the flanges are provided with apertures adjacent the points of contact of the screws 31 through which machine screws 32 are inserted and threaded into the end of the screws 31. The heads of the screws 32 thus engage the under surface of the flanges 23 and hold the flanges and the lower ends of the screws 31 in engagement. For the purpose of preventing the screws 31 from becoming loosened, a lock nut 33 of usual form is preferably provided thereon.

With the construction just described, after the frame 17 has been welded or riveted to the casing 12, if it is found that the flanges 23 are not perfectly parallel to the copyholder, the tracks 18, nevertheless, may be brought into proper position by suitably turning the various adjusting screws 31 to raise or lower the frame 24 relatively to the frame 17 at necessary points.

The lens mounting element 19 may be secured for movement in various ways upon the tracks 18, but in the present instance the upper side portions 34 of the mounting frame are provided with grooves which engage the edges of the tracks 18. The mounting frame 19 may be conveniently adjusted along track 18 by means of a pair of racks 35 which are secured on the lower surfaces of the tracks 18 and with which a pair of gears 36 are adapted to mesh. The gears 36 are mounted on a shaft 37 journalled at its ends in the portions 34 of the frame and the end of the shaft is provided with a hand wheel 38 by which the gears 36 may be rotated to propel the mounting frame 19 along the tracks.

The copyholder 14 is preferably mounted for movement toward and from the lens and for movement parallel to the lens axis for the purpose of positioning the document or copy a proper distance away from the lens and for centering the copy with reference to the optical axis. For this purpose the copyholder 14 is movably mounted upon the horizontal upper edges 14ª of a pair of supporting arms 39, secured at their inner ends to a carriage 40 which is movable along vertically disposed tracks or guides 41.

While the tracks or guides 41 may be disposed vertically or inclined in either direction, they are preferably inclined downwardly to the rear for the purpose of providing a construction which will give a maximum range to the camera with a minimum of size and extent of movement of the parts and with a lens of minimum focal length.

Due to the methods of construction preferably used, as outlined above, it has been found desirable to so associate the guides or tracks 41 with the casing 12 that they may be shifted relatively to the face of the casing to insure that the transverse dimension of the copyholder will be positioned at right angles to the optical axis. For this purpose there is provided on the front of the casing 12 a pair of upper bracket members 42 and a pair of lower bracket members 43 to which are secured respectively an upper cross member 44 and a lower cross member 45. The cross members 44 and 45 and the tracks 41 form a rectangular frame, the tracks being bolted at their ends, as at 46, to each end of the upper and lower cross members 44 and 45.

The cross members 44 and 45 are adjustably secured against their respective bracket members by means of slotted apertures 47 formed in the cross members through which bolts 48 pass and are threaded into the brackets 42 and 43, as best shown in Fig. 7. A washer 49 is preferably provided against which the heads of the bolts 48 engage at each slot 47.

Means are preferably provided for adjusting the corners of the track frame toward and from the face of the casing 12 so that, in case the casing 12 is warped in the construction thereof, it will be possible to secure the tracks in proper position in spite of the fact that the face of the casing does not present a true plane. For this purpose, the cross members of the track frame are threaded to receive jack bolts 48$^a$ which bear at their ends against the face of the brackets 43, as best shown in Fig. 12. Thus by unscrewing the bolt 48 and screwing up the bolts 48$^a$ by a corresponding amount, the corners of the track frame may be adjusted and held in a position farther from the face of the casing. By reversing the process the corners of the frame may be brought closer to the face of the casing. By this means it is possible to position the tracks in the exact angular relation necessary for maintaining the surface of the copyholder constantly in the proper relation to the optical axis.

From the foregoing it is apparent that if the tracks 41 are not disposed in exact vertical alinement with reference to a plane passing through the optical axis and the center line of the apparatus, it will be possible to move the cross members transversely due to the provision of the slots and thus by this means the tracks may be secured in proper position; and if the inclined surface of the casing is warped to any extent, due to the economical construction methods employed, it will be possible, through the medium of bolts 48 and 48$^a$ at the corners of the track frame, to adjust the tracks to the proper angle to insure the correct positioning of the copyholder at every point in its movement.

The carriage portion 40 of the copyholder is preferably of skeleton construction, having its ends terminating adjacent the tracks 41. At each end of the carriage 40 is provided an upper frame construction 50 which supports a wheel 51 bearing on one side of the track and a lower frame construction 52 supporting a wheel 53 contacting with the other side of the track, see Fig. 5.

In the event that, after the apparatus has been set up, the copyholder assumes a position which is inclined from front to rear relatively to the optical axis, it is desirable to have means for correcting this so as to bring the longitudinal dimension of the copyholder into exact right-angular relation with the optical axis. To this end the arms 39 are each pivotally mounted upon the carriage frame 40 upon pivot pins 54 which are suitably carried in lugs formed upon the frame. At the lower inner end of each of the arms 39 there is provided a set screw 55 threaded therein and bearing at its end against the carriage frame 40. Thus, by turning the set screws in one direction or the other, the arms 39 may be swung about the pivots 54 to bring the front to rear dimension of the copyholder into a position at right angles to the optical axis. Suitable lock nuts 56 are provided on the set screws 55 for the purpose of preventing accidental movement thereof after adjustment.

In order to prevent lateral swinging or vibration of the lower edges of arms 39, a lug 57 is formed on the carriage 40 at each side thereof, the face of which contacts with the lower edge of the arm.

Means are provided for moving and holding the carriage 40 in the correct adjusted position along the guide tracks 41. In the present instance, this means comprises a screw threaded shaft 58 journalled at its lower end in a bearing 59 in the cross member 45 and at its upper end journalled in a bearing 60 on the cross member 44. The threaded part of shaft 58 engages in a nut 61 secured in the central part of the carriage. Thus, when the threaded shaft 58 is rotated, it will be seen that the carriage 40 will move upwardly or downwardly along the guide tracks 41 according to the direction of rotation. The nut 61 may be non-rotatably secured with the carriage in any desired manner, but in the present instance, the carriage frame is provided at its central part with an enlarged portion 62 having therein a square-shaped aperture into which a smaller square-shaped portion 62 on the nut 63 is adapted to be inserted. By reference to Figs. 9 and 10, it will be seen that the portion 63 of the nut fits somewhat loosely in the opening in the hollow part 62. By this construction the nut is prevented from binding upon the shaft 58 in any of the various adjusted positions of the tracks 41.

The threaded shaft 58 is rotated by means of a handle, not shown, secured to the end of a jack shaft 64 which is journalled in the bearing bracket 65 on the cross piece 44. The shaft 64 carries at its inner end a bevel gear 66 which meshes with a similar bevel gear 67 on the upper end of the shaft 58. It will thus be seen that rotation of the shaft 64 will produce movement of the carriage 40 along the guide tracks 41.

In the use and operation of the apparatus in making enlarged or reduced photographic prints the lens system is adjusted outwardly or inwardly on the tracks 18 and the copyholder is correspondingly adjusted toward or from the lens and in a direction parallel to the lens axis, depending upon the size of reproduction which it is desired to obtain. It is necessary for obtaining properly focused prints that the plane of the copyholder be at all times parallel to the focal plane or at right angles to the optical axis. Accordingly, after the apparatus has been constructed and assembled, in case the frame 17 is not exactly in parallel relation to the surface of the copyholder, the lens mounting member, nevertheless, may be properly positioned by tiltingly adjusting the tracks 18 either transversely or longitudinally through the medium of the adjusting screws 31 as above set forth. After the copyholder and associated parts have been assembled, if the plane of the copyholder is laterally inclined away from right-angular relation to the optical axis, this may be corrected by laterally moving the upper or lower ends of the guide tracks 41 in the appropriate direction until the copyholder has been tilted transversely a sufficient amount to bring its transverse dimension at right angles to the optical axis. The guide tracks 41 will then be secured in this position by means of the bolts 48.

After this adjustment has been made, it may be found that the plane of the copyholder is tilted from front to rear or longitudinally away from a right-angular relation to the optical axis. In such case, in order to properly position the copyholder in this direction, the adjusting screws 55 for the arms 39 will be turned in one direction on the other to raise or lower the ends of arm 39 and thus tilt the plane of the copyholder longitudinally until it assumes a position at right angles to the optical axis.

From the foregoing it will be apparent that there is provided a photographic apparatus, having a frame work which may be rapidly and economically constructed in a firm and rigid manner and having means associated with the frame of the device for effecting extremely accurate assembly of the operating parts thereof with relation to each other.

As many possible embodiments of the invention as disclosed may be made, it is to be understood that all matter hereinbefore set forth or shown in the drawings is to be interpreted as illustrative and not in a limiting sense.

I claim as my invention:

1. In photographic apparatus, the combination with a camera body of a support fixed to said body, guiding means on said support, a mounting element movable on said guiding means and carrying a lens and prism, a copyholder, guiding means on which said copyholder is supported for movement toward and from the lens, and means for adjusting the relative positions of said copyholder and lens, said means comprising mechanism associated with said lens and prism guiding means by which said guiding means may be moved relatively to its support.

2. In photographic apparatus, the combination of a camera casing, a support extending therefrom, guiding means secured to said support, a mounting element for a lens and prism system movable along said guiding means, a copyholder, mechanism mounting said copyholder adjustably for movement toward and from the lens axis and for centering movement relatively thereto whereby an object may be positioned in exposing relation to the lens and prism system, and means for tiltingly adjusting said guiding means on said support either transversely or longitudinally thereof to alter the angle of the rays passing from the copyholder to the prism and lens.

3. In photographic apparatus, the combination of a support, a lens and prism system guided for movement thereon parallel to the lens axis, a copyholder support, guiding means on which said copyholder support is mounted for movement toward and from the lens axis, a copyholder, mechanism for mounting said copyholder on said support for movement transversely to the direction of movement of said support, and means for adjusting the position of the guiding means for said copyholder support to bring said copyholder into proper position relatively to the optical axis.

4. In photographic apparatus, the combination of a support, a mounting element for a lens and prism system, guiding means on said support upon which said mounting element is adapted to travel, a copyholder support, guiding means on which said copyholder support is mounted for movement toward and from the lens axis, a copyholder, mechanism for mounting said copyholder on said copyholder support for movement transversely to the direction of travel thereof, and means for adjusting at least one of said above mentioned guiding means to position the copyholder and the optical axis of the lens system in proper relations to each other.

5. In photographic apparatus, the combination of a support, a lens and prism system guided thereon for movement parallel to the lens axis, a copyholder support, guiding means on which said copyholder support is mounted for movement toward and from the lens axis, a copyholder for positioning an object in exposing relation to the lens and prism system, guiding means on said copyholder support on which said copyholder is movably mounted, means for adjusting said first mentioned guiding means to vary the angle of the transverse dimension of the copyholder relatively to the optical axis, and means for adjusting said second mentioned guiding means to vary the angle of the longitudinal dimension of the copyholder relatively to the optical axis.

6. In photographic apparatus, the combination of a support, a lens and prism system guided thereon for movement parallel to the lens axis, a copyholder support, guiding means on which said copyholder support is mounted for movement toward and from the lens axis, a copyholder for positioning an object in exposing relation to the lens and prism system, guiding means on said copyholder support on which said copyholder is movably mounted, and means for adjusting said first mentioned guiding means to vary the angle of the transverse dimension of the copyholder relatively to the optical axis.

7. In photographic apparatus, the combination of a support, a lens and prism system guided thereon for movement parallel to the lens axis, a copyholder support, guiding means on which said copyholder support is mounted for movement toward and from the lens axis, a copyholder for positioning an object in exposing relation to the lens and prism system, guiding means on said copyholder support on which said copyholder is movably mounted, and means for adjusting said second mentioned guiding means to vary the angle of the longitudinal dimension of the copyholder relatively to the optical axis.

8. In photographic apparatus, the combination of a mounting element for a lens and prism system, guiding means along which said element is movable parallel to the lens axis, a copyholder support, guiding means on which said support is mounted for movement toward and from the lens axis, a copyholder mounted on said support for movement transversely to the direction of movement of said support for positioning an object thereon in exposing relation to the lens and prism system, means for adjusting said first mentioned guiding means to vary the relation of the optical axis with the copyholder, means for adjusting said second mentioned guiding means for tilting the plane of the copyholder transversely, relatively to the optical axis, and means for adjusting said third mentioned guiding means for tilting the plane of the copyholder longitudinally relatively to the optical axis, said several adjusting means serving thereby to locate the optical axis and the copyholder so that in all positions of adjustment of the device the optical axis will have a constant angular relation to the copyholder.

9. In photographic apparatus, the combination of a camera lens system, a casing for the apparatus, a copyholder support, guiding means on said casing on which said copyholder support is mounted for adjusting movement toward and from the lens system, a copyholder on said support for holding an object in exposing relation to said lens system, said guiding means comprising a pair of vertically disposed track members, and means for shifting at least one end of each of said track members toward or away from said casing to vary the angular relation of the tracks to the optical axis thereby insuring the maintenance of a constant angular relation between the optical axis and the copyholder in all of the adjusted positions of the latter.

10. In photographic apparatus, the combination of a camera lens system, a casing for the apparatus, a copyholder support, guiding means on said casing on which said copyholder support is mounted for movement toward and from the lens system, a copyholder on said support for holding an object in exposing relation to said lens system, said guiding means comprising a pair of vertically disposed track members, means for shifting at least one end of each of said track members toward or away from said casing, and means for shifting at least one end of each of said track members along the face of said casing transversely to their direction of extent, said last two mentioned means serving thereby to bring said tracks into substantially symmetrical relation to the optical axis.

11. In photographic apparatus, the combination of a camera lens system, a copyholder support, guiding means on which said copyholder support is mounted for movement toward and from the lens system, a copyholder on said support for holding an object in exposing relation to said lens system, said guiding means comprising a pair of vertically disposed track members, and means for shifting at least one end of each of said members transversely to their direction of extent to vary the relation of the plane of the copyholder to the optical axis.

12. In photographic apparatus, the combination of a camera lens system, a copyholder associated therewith for holding objects in exposing relation to said lens system, vertically disposed guide tracks below said lens system, a carriage movably mounted on said tracks, laterally extending arms on said carriage for supporting said copyholder, said arms being pivotally connected to said carriage, and means associated with said arms and said carriage for varying the angular relation of the arms thereto for varying the plane of the copyholder relatively to the optical axis.

13. In photographic apparatus, the combination of a camera casing, a support extending therefrom, a mounting element for a lens system, a frame including guide means for adjustably supporting said mounting element for longitudinal movement along said frame, and means for adjustably supporting said frame at spaced points from said support whereby the plane of said frame may be tiltably adjusted either transversely or longitudinally with respect to the support.

ARTHUR W. CAPS.